(12) United States Patent
Ferrell et al.

(10) Patent No.: US 11,713,135 B2
(45) Date of Patent: Aug. 1, 2023

(54) SYSTEM AND METHOD FOR DETERMINING AIRCRAFT SAFE TAXI, TAKEOFF, AND FLIGHT READINESS

(71) Applicant: Borealis Technical Limited, North Plains, OR (US)

(72) Inventors: Stuart Mark Ferrell, Burnsville, MN (US); William T. Reed, New York, NY (US); Jan Vana, Prague (CZ); Isaiah W. Cox, London (GB)

(73) Assignee: Borealis Technical Limited, Isle of Man (IM)

( * ) Notice: Subject to any disclaimer, the term of this patent is extended or adjusted under 35 U.S.C. 154(b) by 135 days.

(21) Appl. No.: 16/816,161

(22) Filed: Mar. 11, 2020

(65) Prior Publication Data

US 2020/0290750 A1    Sep. 17, 2020

Related U.S. Application Data

(60) Provisional application No. 62/816,868, filed on Mar. 11, 2019.

(51) Int. Cl.
*B64D 45/00*    (2006.01)
*B64D 43/00*    (2006.01)
(Continued)

(52) U.S. Cl.
CPC ......... *B64D 45/0005* (2013.01); *B64D 43/00* (2013.01); *B64D 47/08* (2013.01);
(Continued)

(58) Field of Classification Search
CPC ............... B64D 45/0005; B64D 47/08; B64D 2045/001; B64D 43/00; B64D 2045/0075;
(Continued)

(56) References Cited

U.S. PATENT DOCUMENTS

| | | |
|---|---|---|
| 5,047,942 A | 9/1991 | Middleton et al. |
| 5,519,391 A | 5/1996 | Paterson et al. |

(Continued)

FOREIGN PATENT DOCUMENTS

| | | |
|---|---|---|
| EP | 0980828 A1 | 2/2000 |
| GB | 2568356 A | 5/2019 |
| GB | 2576617 A | 2/2020 |

OTHER PUBLICATIONS

FLAP Sensor for Glider https://gliding.lxnav.com/products/flaps-sensor/.
(Continued)

*Primary Examiner* — Christian Chace
*Assistant Examiner* — Shayne M. Gilbertson

(57) ABSTRACT

A monitoring system and method are provided for real time monitoring of flaps, landing gears, or tail skids to determine safe taxi, takeoff, and flight readiness. Monitoring units, including scanning LiDAR devices combined with cameras or sensors, mounted in aircraft exterior locations produce a stream of meshed data that is securely transmitted to a processing system to generate a real time visual display of the flaps, landing gears, or tail skid for communication to aircraft pilots to ensure safe aircraft taxi, takeoff, and flight readiness. Actual flap position alignment with optimal flap setting, proper retraction and extension positions of landing gears, and tail skid condition is ensured. Safety of aircraft taxi, takeoff and flight and airport operations are improved when the present system and method are used to prevent incidents related to misaligned flaps and improperly positioned landing gears or tail skids.

19 Claims, 2 Drawing Sheets

(51) Int. Cl.
*G08G 5/06* (2006.01)
*G08G 5/00* (2006.01)
*B64D 47/08* (2006.01)

(52) U.S. Cl.
CPC ............ *G08G 5/0095* (2013.01); *G08G 5/06* (2013.01); *B64D 2045/0075* (2013.01)

(58) Field of Classification Search
CPC .. B64C 25/405; G08G 5/0021; G08G 5/0095; G08G 5/06
See application file for complete search history.

(56) References Cited

U.S. PATENT DOCUMENTS

| | | | |
|---|---|---|---|
| 6,264,135 B1 * | 7/2001 | Dacosta | B64D 47/08 340/963 |
| 7,338,018 B2 | 3/2008 | Huynh et al. | |
| 10,308,352 B2 | 6/2019 | Cookman et al. | |
| 11,165,994 B2 * | 11/2021 | Dedeoglu | H04N 21/21805 |
| 2004/0200930 A1 * | 10/2004 | Bays-Muchmore | B64C 25/00 244/109 |
| 2014/0241572 A1 * | 8/2014 | Tillotson | B64D 47/08 382/103 |
| 2015/0051757 A1 | 2/2015 | Cox et al. | |
| 2016/0176541 A1 * | 6/2016 | Kneuper | G08G 5/0021 701/3 |
| 2016/0351061 A1 * | 12/2016 | Lamkin | G08G 5/0021 |
| 2018/0013985 A1 * | 1/2018 | Lee | H04N 7/181 |
| 2019/0270521 A1 * | 9/2019 | Meis | G06T 7/001 |
| 2019/0300204 A1 * | 10/2019 | Dong | G06V 20/56 |
| 2019/0375520 A1 * | 12/2019 | Parker | G01M 5/0091 |
| 2020/0013301 A1 | 1/2020 | Vana et al. | |

OTHER PUBLICATIONS

Search Report Under Section 17 (Patents Act 1977), Application GB2003473.2, UK Intellectual Property Office, dated Jul. 20, 2020.

* cited by examiner

SYSTEM AND METHOD FOR DETERMINING AIRCRAFT SAFE TAXI, TAKEOFF, AND FLIGHT READINESS

PRIORITY CLAIM

This application claims priority from U.S. Provisional Patent Application No. 62/816,868, filed 11 Mar. 2019, the entire disclosure of which is fully incorporated herein in its entirety.

FIELD OF THE INVENTION

The present invention relates generally to systems and methods for determining takeoff and flight readiness of aircraft and specifically to a monitoring system and method providing visual confirmation to an aircraft cockpit that aircraft external components are in safe taxi, takeoff, and flight ready positions.

BACKGROUND OF THE INVENTION

Airport ground travel surfaces can be very congested places at today's airport terminals. Multiple aircraft are simultaneously arriving and departing, ground-based service and support vehicles and personnel are servicing parked aircraft, and ground crews are directing the arriving and departing aircraft into and out of gates. The avoidance of adverse ground incidents in these areas requires careful monitoring and control of the locations and movements of aircraft, ground vehicles, equipment, and personnel as pilots maneuver aircraft prior to takeoff. Aircraft pilots and cockpit crews must check flight plans and complete checklists under these conditions and, not only must they maneuver aircraft to prevent ground incidents, but they must also ensure that aircraft are ready for safe taxi to a takeoff location, for safe takeoff and then for safe flight.

Driving an aircraft on the ground during taxi with pilot-controlled landing gear wheel-mounted electric taxi or other drive systems without reliance on operation of the aircraft's main engines or the use of tow vehicles has been proposed by Applicant and others. As the pilot controls operation of electric taxi drive systems to maneuver an aircraft independently of engines and tugs during taxi to, from, and within an airport ramp area, pilot situational awareness may be increased compared to when aircraft are driven only with operating engines or even towed with tugs or moved with aircraft transfer apparatus. This increased pilot situational awareness is likely to improve aircraft ground travel safety. Monitoring of the ground level environment external to the portions of the aircraft not readily visible to the pilot or crew driving the aircraft would further improve pilot situational awareness, avoid potential collisions, and enhance safe operation of the aircraft as they are driven independently with electric taxi drive systems, and such monitoring and systems for conducting such monitoring have been proposed by Applicant. Portions of the aircraft exterior, primarily below the wings, not visible to the pilot and flight crew from the cockpit, may be equipped with cameras and sensors mounted on aircraft exterior locations to improve visibility of these exterior locations from the cockpit. While potentially helpful in avoiding collisions during ground maneuvers within an airport ramp area, there may be limitations to the information obtained, especially during low visibility weather conditions. Monitoring systems for aircraft driven with electric taxi drive systems that employ different types of sensing devices mounted on the exterior of the aircraft to provide an expanded view of the aircraft's ground travel path during pushback prior to taxi to a takeoff runway have also been proposed by Applicant. The available monitoring systems, whether on aircraft or on airport ramp structures or buildings, are directed to monitoring and providing information about the aircraft exterior ground travel environment so that collisions and ground incidents involving adjacent aircraft, ground vehicles or personnel, and ground structures may be prevented. Monitoring positions of external aircraft components to ensure readiness for safe taxi, takeoff, and flight has not been previously proposed.

The pilot and cockpit crew of an aircraft cleared for departure and takeoff must complete a number of tasks to ensure that the aircraft is ready for safe taxi to a takeoff location, safe takeoff, and safe flight. While pilot situational awareness during ground maneuvers within and out of a ramp area is greatly improved when an aircraft may be driven independently of tow vehicles and engines during pushback, there are still a number of checklist and other tasks that must be accomplished if the aircraft is to be ready for safe taxi, takeoff, and flight. Among the checklist tasks required prior to takeoff is setting the aircraft flaps at a setting that may be required for takeoff from a specific runway to which the aircraft has been assigned. Performance data required for the aircraft's takeoff may be acquired by an outside source and sent to the Flight Management Computer (FMC) in the aircraft cockpit. The FMC performance data may not look at the takeoff flap setting set by the pilot. During the process of preparing the aircraft for takeoff, the pilot must currently visually crosscheck the flap gauge with the FMC data to ensure that the flaps are at the correct setting. It is not presently possible for a pilot actually to see the aircraft's flaps to verify flap positions. While electromechanical flap sensors that measure flap position or angle have been proposed for gliders, available systems for aircraft powered for flight by engines provide only reactionary warnings when flap positions and flap settings are not aligned. These reactionary warnings, moreover, may not be activated until an aircraft's actual takeoff roll. Improper flaps settings and/or settings that cause misaligned flaps may not be detected by current warning systems and may not activate a warning. Takeoff of the aircraft under these circumstances could have serious adverse consequences.

In addition to the flaps, aircraft exterior components and systems that should be checked for takeoff and flight readiness include the aircraft's landing gears, tires mounted on landing gear wheels, and, after takeoff, landing gear position. When an aircraft is driven by electric taxi drive systems within a ramp area where there are ground personnel positioned to guide the aircraft during pushback, the ground personnel may visually inspect landing gear structures and tires. When the aircraft is driven out of the ramp area and onto taxiways to a takeoff location, the landing gears, landing gear components, and tires are no longer visible to ground personnel. The aircraft's pilot and flight crew typically do not have views of locations of the aircraft's landing gear on runways during taxi-out procedures, nor can they see landing gear components or tires during taxi to assess where the landings gears are on the runway or whether landing gear components and tires are functioning normally.

Once the aircraft has taken off, whether the landing gears have retracted normally may be indicated in some aircraft by an arrangement of primary and secondary landing gear position indicator lights. If the primary indicator lights indicate a non-normal condition, i.e., a landing gear is extended when it should be retracted, the secondary indicator lights should confirm the non-normal condition. In an illustrative situation, after an aircraft takeoff, the primary indicator lights indicated a non-normal landing gear condition (landing gear extension), but the secondary indicator lights indicated that the landing gear condition was normal (landing gear retraction). The pilot and crew were faced with conflicting information, and they could not visually verify which condition was accurate. To avoid a potentially dangerous situation, they flew the aircraft by the tower, which is not allowed, and requested verification of the abnormal landing gear position from tower personnel. A less drastic solution to this situation is clearly needed.

The foregoing discussion indicates the need for a system and method that improves pilot situational awareness of conditions and positions of aircraft exterior components important for safe taxi, takeoff, and flight readiness and that enables pilots and cockpit crews to obtain clear and accurate visual information which reflects the real time positions and conditions of aircraft exterior components, including aircraft flaps and landing gears, to ensure safe taxi, takeoff, and flight readiness.

SUMMARY OF THE INVENTION

It is a primary object of the present invention, therefore, to provide a monitoring system that enables pilots and cockpit crews to obtain clear and accurate visual information relating to an aircraft's safe taxi, takeoff, and flight readiness, particularly information that reflects the real time positions and conditions of aircraft flaps and landing gears.

It is another object of the present invention to provide a monitoring method that enables pilots and cockpit crews to obtain clear and accurate visual information relating to an aircraft's safe taxi, takeoff, and flight readiness, particularly information that reflects the real time positions and conditions of aircraft flaps and landing gears.

It is an additional object of the present invention to provide a monitoring system that provides a visual inspection of aircraft surfaces and structures, including at least flaps and landing gears, to a pilot and cockpit crew to confirm that actual positions align with settings so that the aircraft is in a safe flight ready state.

It is an additional object of the present invention to provide an aircraft monitoring system that visually monitors the aircraft's flaps settings and automatically communicates a real time view of the aircraft's flaps position and a visual, audio, or other indication of the alignment or misalignment of flaps position with flaps settings to the aircraft cockpit.

It is an additional object of the present invention to provide a monitoring method that enables pilots to safely set flap settings prior to or during forward taxi and verify flap positions during taxi to a takeoff location.

It is a further object of the present invention to provide an aircraft monitoring system that visually monitors the aircraft's landing gear positions and automatically communicates a real time view of the aircraft's landing gears and a visual, audio, or other indication of improperly extended or retracted landing gears or other unsafe condition to the aircraft cockpit.

It is yet a further object of the present invention to provide a monitoring system that provides real time visual points of view of external aircraft structures to the aircraft cockpit and is electronically integrated with the aircraft's flight management computer, an electronic flight bag, and other data systems.

It is yet a further object of the present invention to provide an aircraft monitoring system that visually monitors at least the aircraft's tail position and landing gear runway locations and automatically communicates a real time view of the locations of the aircraft tail and landing gears and provides warnings that will enable a pilot to avoid a tail strike or a runway excursion.

It is yet a further object of the present invention to provide a monitoring system for aircraft driven independently with electric taxi drive systems during ground surface travel at an airport employing monitoring units that may be a combination of a camera and/or a sensor and a scanning LiDAR device mounted in exterior aircraft locations to produce meshed real time and recorded data with views of the aircraft's flaps and with views of the aircraft's landing gears and tail for communication to the aircraft cockpit and integration with the aircraft's flight management computer and flaps, landing gear, and tail position indicators.

In accordance with the aforesaid objects, an integrated monitoring system and method are provided with capability for the real time monitoring of aircraft external structures and surfaces to determine the aircraft's readiness for taxi, takeoff, and flight and to maximize safety of aircraft takeoff. Monitoring units, which may be a scanning LiDAR device, either alone or in combination with a camera or another sensing device, are mounted in locations on the aircraft exterior to produce a composite stream of data that may be securely meshed and transmitted to an intelligent processing system to generate a visual display of the monitored area, particularly the aircraft flaps and landing gears and the aircraft's tail, for communication to aircraft pilots and airport control personnel with responsibility for determining an aircraft's readiness for taxi, takeoff and flight. The monitoring system and method may be advantageously employed on aircraft driven independently during taxi with electric taxi drive systems. Meshed real time and recorded data from the monitoring units may be transmitted to the intelligent processing system and may be communicated as an integrated visual display to the aircraft's cockpit to provide visually accurate information relating to flaps positions and settings and landing gear and tail positions.

An aircraft's flaps positions may be set and continuously monitored and automatically or manually altered with the present system and method to ensure that the flap positions align with optimal flap settings for the aircraft on the runway at the airport where the aircraft is taking off. Continuous monitoring of an aircraft's landing gears during takeoff and prior to landing, as well as during taxi, may ensure that landing gears are retracted or extended, as required and that conditions of tires or other landing gear components are normal. Landing gear positions may be automatically or manually adjusted as required, both to ensure that the landing gears are properly retracted or extended and to ensure that they are safely moving the aircraft on a runway surface. The position of the aircraft's tail during takeoff may additionally be monitored and automatically or manually changed to prevent a tail strike during takeoff.

The integrated monitoring method of the present invention may improve the safety of aircraft takeoff and of airport operations when the monitoring system is used to enable pilots and others with responsibility for aircraft readiness for takeoff and flight to ensure that aircraft flaps and landing gears are optimally takeoff and flight ready and that tail strikes are avoided.

Other objects and advantages will be apparent from the following description, claims, and drawings.

DESCRIPTION OF THE INVENTION

Figure 1:
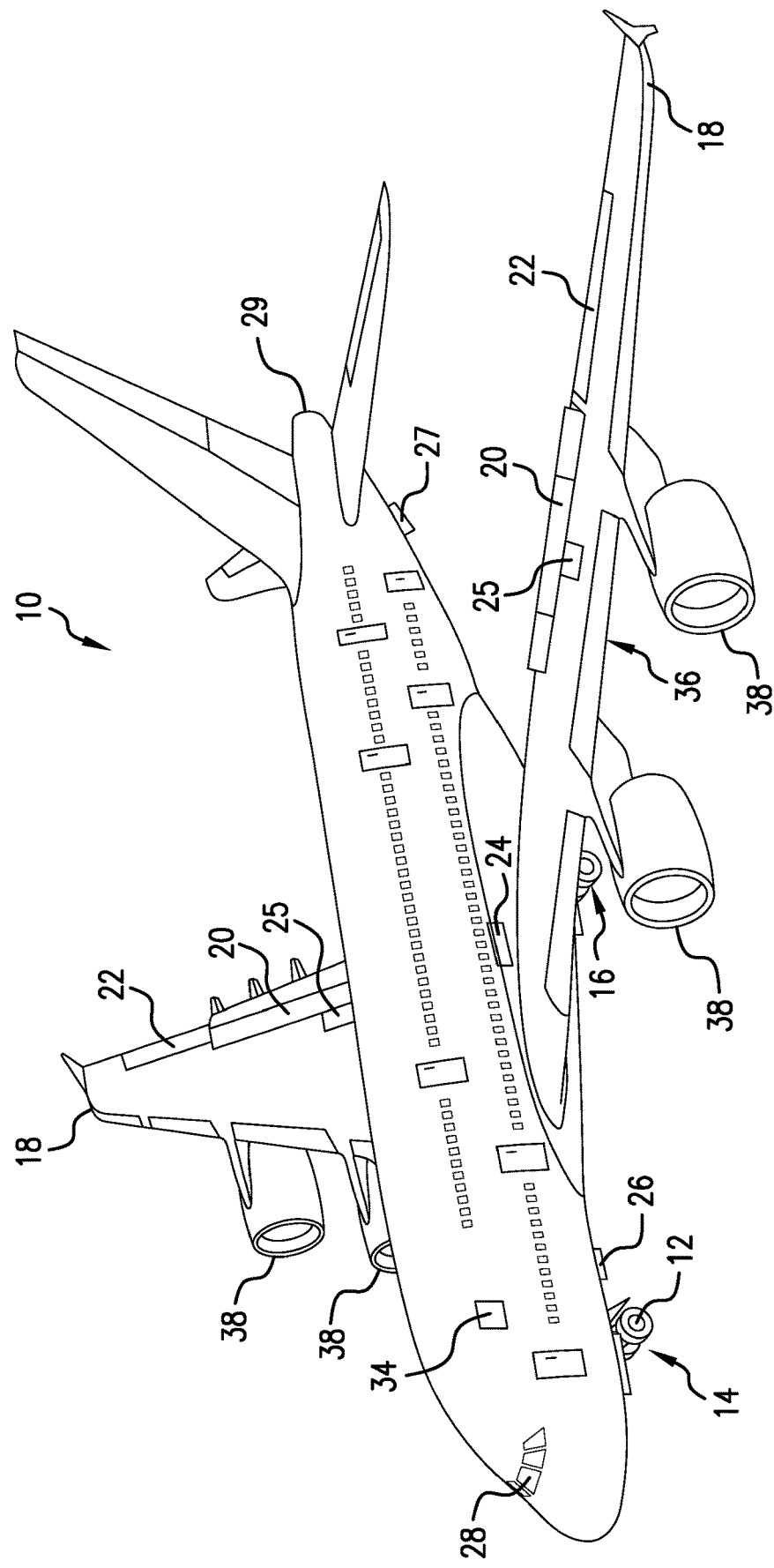
FIG. 1 is a side perspective view of an aircraft driven on a ground surface with an engines-off electric taxi system equipped with the integrated monitoring system of the present invention.

The movement of aircraft into, out of, and within congested airport ramp surface areas safely while avoiding collisions and other adverse ground incidents is critical to maintaining the safety of the aircraft, as well as that of all persons and vehicles in this airport area. Monitoring systems may improve situational awareness as aircraft pilots and flight crew are driving an aircraft during ramp ground surface operations by providing a clear view of the spatial environment around the moving aircraft from the cockpit, as well as from ramp and ground control perspectives. Available monitoring systems, however, have focused primarily on the ground environment around an aircraft's exterior and the relative locations of adjacent aircraft, ground vehicles and personnel, and ground structures. The monitoring system of the present invention provides a targeted view of specific exterior structures on an aircraft, namely the flaps, the landing gears, and the tail, that must be positioned according to optimal settings or positions for an aircraft to taxi, takeoff, and fly safely, or to land safely and taxi safely after landing. The meshed data collected and analyzed from the monitoring system may enable manual or automatic control of the aircraft's flap setting and position and landing gear and tail positions for optimal taxi, takeoff, and flight readiness or optimal landing readiness. In addition, this data may be meshed with the electric taxi drive system to control and alter the aircraft's ground travel, if required, and thereby avoid a potential collision incident or runway excursion or incursion.

Currently, in aircraft driven during taxi by aircraft engines, flap takeoff settings are throttle activated. A warning is sent to the cockpit only if flaps are not within an identified takeoff range. This reactionary warning system is activated on the aircraft's actual takeoff roll. Flap position, which may raise the maximum lift coefficient, especially on takeoff, affects the speed at which an aircraft can safely maintain flight. The effect of flap position, which may cause the aircraft nose to rise or lower and the aircraft tail to correspondingly lower or rise, depends on the type of aircraft and the type of flap. There is more variation in takeoff flap position for airports and runways now than in the past, and more attention must be paid to optimal flap settings to ensure a safe takeoff. If the flap settings and, therefore the flap positions, are not within an optimal range for the specific airport or the specific runway, an accident or incident related to incorrect takeoff flap settings may occur. When aircraft are driven by electric taxi drive systems and equipped with the present integrated monitoring system, pilots are able to visually confirm optimal flap settings for the airport or runway, and flap settings may be adjusted manually or automatically, as required.

The more complex and variable changes in aircraft configurations, including flap settings, for takeoffs from different runways that are commonly encountered by today's pilots has led to increased incidences of tail strikes during takeoff. In the past, it was typical procedure to keep flap settings relatively constant while adjusting speed and power settings. Now, all three elements are routinely subject to change when there is a last minute change in runway assignment. In the name of efficiency, airline engineering departments are increasingly introducing more runway specific optimal flap settings coupled with variable speed and power settings for takeoff, representing a paradigm shift from the past practices to which most pilots are accustomed. Airlines may be implementing such changes without providing pilots sufficiently enhanced awareness of current flap settings. This insufficient pilot awareness may be a possible cause of improper flap settings for takeoff, as takeoff flap settings are always set manually by the pilot. The present monitoring system verification procedure is intended to alert pilots of incorrectly configured flaps prior to takeoff and to significantly reduce and potentially eliminate consequences that may result from improper flap settings, as well as misaligned flap requirements and flap positions.

Prior to takeoff, performance data for an aircraft, for example a Boeing 737NG, is usually acquired by an outside source and sent to the aircraft flight deck, where it is manually loaded to the Flight Management Computer (FMC). The performance data for the aircraft may also be externally uploaded in the FMC. The pilot typically sets the takeoff flap setting. The FMC performance data, however, does not look at the actual takeoff flap setting set by the pilot. In the event that the flaps are incorrectly set based on the required performance data, and there is no aircraft takeoff warning activated, continuing the takeoff process may be accompanied by adverse consequences. For example, a Flaps 5 takeoff setting may be used on a Boeing 737NG more than 90% of the time in normal routine operations. When the airport where the aircraft is taking off has a short runway that requires a Flaps 25 setting and the pilot selects the usual Flaps 5 setting, the flaps setting is not aligned with the performance data. As a result, the aircraft nose position and speed may be incorrect for takeoff, and the takeoff may potentially be disastrous. To avoid this situation, the only way to confirm the flaps setting at present is to visually crosscheck the flap gauge with the FMC data.

Pilots of aircraft are in a high workload environment during pushback and taxi out to takeoff. In the foregoing example, confirming the flaps setting by visually crosschecking the flaps setting with the FMC data, which is necessary and required 100% of the time, may or may not occur. In another exemplary situation, if a runway change is given to an aircraft by Air Traffic Control (ATC) while the aircraft is taxiing out, the pilot is required to derive new performance data reflecting the change and input it in the FMC. If a different flaps setting is required for the new runway, the pilot must select it. In neither of the situations described above is there an activated takeoff warning if the actual flaps settings are not aligned with the original or new performance data. As discussed below, the system and method of the present invention may provide a significant safety benefit by continuously monitoring flap setting against data inputted in the FMC to confirm and indicate alignment of flaps and data or to provide a warning indication of misalignment prior to takeoff when the flap setting requires a change during taxi or at other times. Advantageously, the present system provides a real time view of the actual flap positions to the cockpit.

In response to instances when pilots set flaps during forward taxi, and improperly set flaps produced adverse consequences, including hull loss crashes, many airlines now require that flaps be set prior to a forward taxi roll. The need to set flaps prior to forward taxi typically delays forward taxi motion by about one to two minutes. The flap setting verification method described herein permits pilots to set flaps at the gate prior to the aircraft being driven with the electric taxi drive system and during forward taxi while permitting a margin of safety that is greater than that possible with current procedures.

The integrated monitoring system of the present invention assists pilots to confirm that an aircraft is takeoff taxi ready and flight ready and that aircraft structures, including flaps and landing gears are in a takeoff taxi and flight-ready state. The present monitoring system may be advantageously employed prior to takeoff and prior to landing. Confirming that flaps settings are optimal may be required prior to and during both landing and takeoff, while landing gear retraction and extension positions may be confirmed just after takeoff and just prior to landing while the aircraft is in flight. Confirming tail position may be important at both takeoff and landing, as well as at other times.

"Electric taxi drive systems" and "electric taxi systems," as used herein, refer to pilot-controllable systems used to drive aircraft independently of operation of aircraft engines and external tow vehicles or aircraft transfer apparatus. Such systems may include electric drive motor assemblies mounted completely within landing gear wheels that are activatable to drive the aircraft during ground travel in response to pilot control. An example of an electric taxi system developed by Applicant to drive an aircraft independently during ground travel without reliance on operation of the aircraft's engines or attachment to external tow vehicles or transfer apparatus is described in commonly owned U.S. Pat. No. 10,308,352, the disclosure of which is fully incorporated herein in its entirety. Other drive systems using drive motors that are not electric, including, for example, hydraulic or pneumatic drive motors may also drive aircraft in connection with the intelligent monitoring system and method of the present invention and are contemplated to be included within the terms "electric taxi drive systems."

The terms "intelligent processor," "artificial intelligence," and "intelligent algorithms" are used herein to refer to and encompass systems of data processing and analysis that are conducted by computers capable of harvesting large amounts of possible input data, including images and other information from monitoring and sensing devices, that may be processed, analyzed, and categorized based on a set of rules and then may be communicated so that appropriate action may be taken, whether automatically by a system receiving the processed and analyzed data or manually by a human.

Referring to the drawings, which may not be drawn to scale, FIG. 1 shows a side perspective view of an aircraft 10 equipped with an electric taxi drive system 12 mounted on the nose landing gear 14 to drive the aircraft during ground operations and travel. The aircraft 10 in FIG. 1 is equipped with a pilot-controllable electric taxi drive system that powers aircraft ground movement without operating engines and tow vehicles. A preferred electric taxi drive system 12 may include a pair of electric drive motors mounted completely within the wheel volume in each nose landing gear wheel or, alternatively or additionally, within one or more of the main landing gear wheels 16 on aircraft 10. The electric taxi drive system is controlled by a pilot and/or the crew of the aircraft from the cockpit 28 to drive an arriving aircraft during taxi-in, to maneuver the aircraft within an airport ramp area into a parking location, and then drive a departing aircraft in forward or reverse out of the parking location to a takeoff runway.

Each wing 18 on the aircraft has a set of flaps 20 inboard of a set of ailerons 22 on a trailing edge of each wing. Monitoring units 24 are positioned in exterior locations on the aircraft to provide a view of the flaps, and monitoring units 26 are positioned in exterior locations that will provide a view of the landing gears. Only one monitoring unit 24 is visible; it is anticipated that a second monitoring unit 24 will be located in a similar position on the opposite side of the aircraft fuselage. Similarly, only one monitoring unit 26 is shown. An additional monitoring unit 26 may be positioned closer to the main landing gears 16. Alternatively, a single monitoring unit 26 may be adapted to provide views of both nose and main landing gears. An additional monitoring unit 27 may be positioned in an advantageous location to provide a view of the aircraft's tail 29. The monitoring units are shown schematically and may be located in these or other locations that best provide the views of the aircraft exterior areas and components described herein. It is contemplated that the monitoring units may be mounted in aerodynamic housings on the aircraft exterior, as pop-up units that retract below the aircraft surface when not in use, or may have other configurations that both provide the required views of the flaps and/or landing gears and do not interfere with the aircraft's aerodynamic surface during flight.

An exemplary monitoring unit that provides and communicates this information may be a scanning LiDAR device, either alone or in a combination with a camera or another sensor. The monitoring unit may generate data from a single source or meshed data from multiple sources for processing and analysis, preferably by a processing system driven by intelligent software. Meshed data, and all other data generated by the system, may be communicated in a secure encrypted form in real time to pilots and all others with responsibilities for aircraft takeoff and landing. Generated data may also be recorded and then communicated in this form. As discussed, single or multiple ones of these monitoring units may be attached to exterior locations on the aircraft. Data from the monitoring units 24, 26, and 27 may be meshed with data from other monitoring units on the aircraft (not shown) that are designed to monitor the aircraft's external ground environment. When needed, alerts or warnings of potential collisions or other incidents may be transmitted to aircraft pilots, ramp control personnel, air traffic control, and all others with a need to receive the data.

The monitoring units should have the capability to continuously and intermittently scan or "sweep" the portions of the aircraft's exterior required to determine flap positions or landing gear positions at all times when they are in use. Monitoring units may optimally operate continuously, intermittently, or in an optimum combination of continuous and intermittent operation to provide a constant stream of data. In one possible monitoring unit configuration of a scanning LiDAR device and a camera, the camera may be set to operate continuously, while the scanning LiDAR device may be set to operate intermittently. Other combinations of continuous and intermittent operation of these and other monitoring units may also be used. This capability may enable the pilot, and potentially others, to determine flap or landing gear position and manually or automatically adjust flap positions to align with optimal flap settings or cause landing gear to retract or extend, as required.

Additional sensors, sensor devices, monitoring devices, and the like, preferably digital or smart devices, that are designed to provide additional information relating to flaps and/or landing gear positions may also augment the capabilities of and provide back-up for the present monitoring system and method. For example without limitation, proximity sensors, ultrasound, radar, sonar, LADAR, and global positioning systems (GPS), similar to those currently used for enhanced environmental monitoring in automobiles, but specifically adapted for aircraft use may be used to enhance the capabilities of the monitoring units described herein. If the effectiveness of one type of sensor or monitoring device is limited, for whatever reason, these additional other sensors or monitoring devices may be available to monitor the aircraft's ramp travel and communicate information to the cockpit and other control locations.

Meshed data from a scanning LiDAR device and/or a camera or other sensor in each monitoring unit 24, 26, and 27 may be sent to an artificial intelligence-based processing system, shown schematically at 34 on aircraft 10, that is preferably an artificial intelligence-based system using intelligent algorithms and capable of intermediate and high level image understanding. The processing system 34 may be located on the aircraft, as shown, or in a control or other location off the aircraft, such as a ground or ramp control location or an airport control tower location where meshed data generated from multiple monitoring units may be securely transmitted for processing and communication. It is contemplated that all data transmissions through the present monitoring system will be encrypted for security and to prevent hacking. The artificial intelligence-based processing system described herein may have the capability to interpolate a three-dimensional view from a single two-dimensional image, in much the same way a human is capable of generating such an image. It is also contemplated that the artificial intelligence-based processing system may track alerts associated with incorrect flaps settings. This and other relevant data may be used to help airline performance departments continue to optimize power settings and flap settings for specific runways at specific airports. Data may also be shared between two or more aircraft that are equipped with the present monitoring systems.

Figure 2:
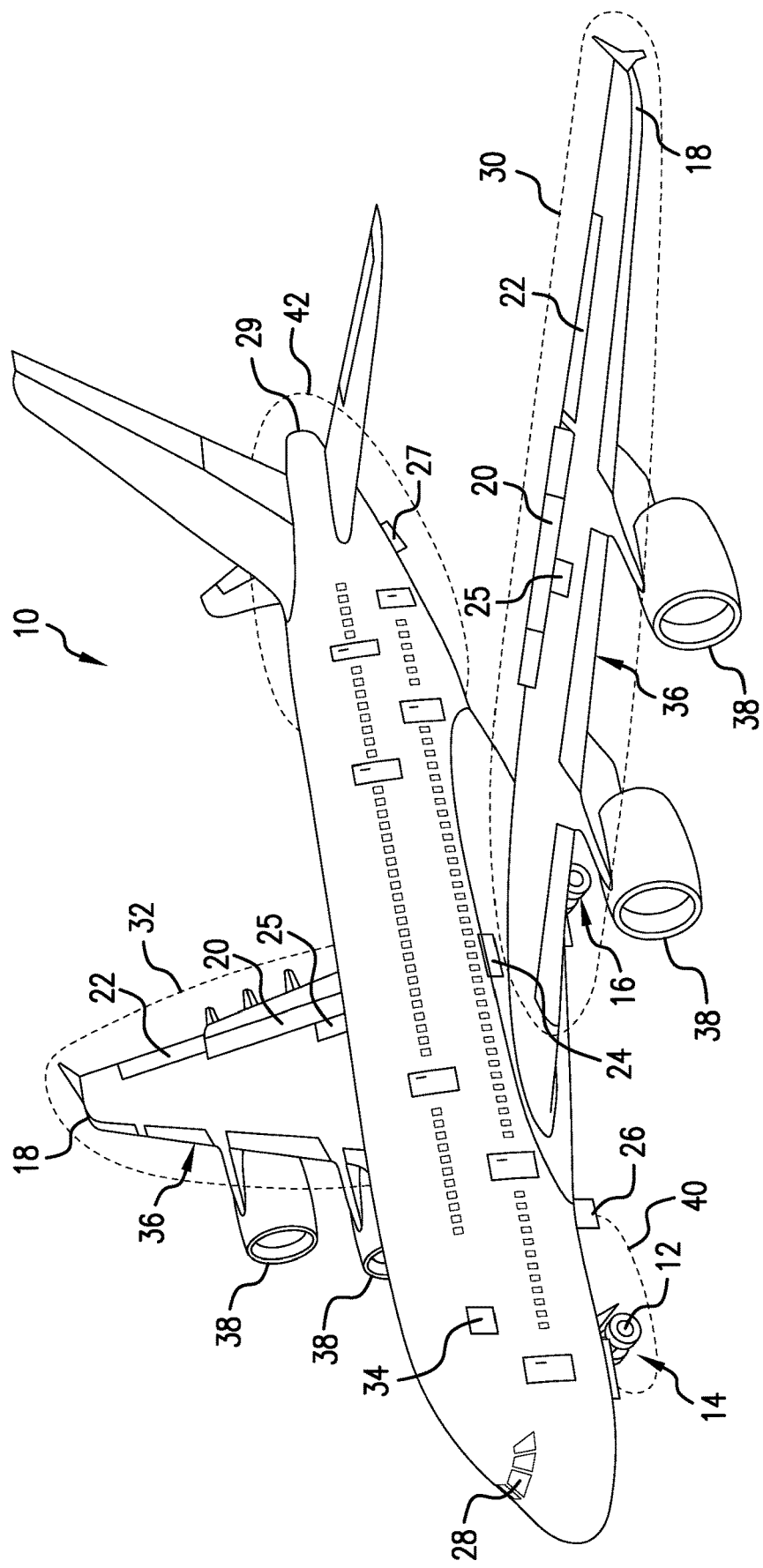
FIG. 2 is a view of the aircraft of FIG. 1 showing selected exterior areas that may be monitored to provide a view of the aircraft's flaps and landing gears as the aircraft is driven with electric taxi drive systems prior to takeoff or prior to landing.

Monitoring flaps positions in accordance with the present invention is shown and discussed with reference to FIG. 2. The monitoring units 24 shown in FIG. 2 are configured and positioned to provide a view of the entire wing 18. It is contemplated that a monitoring unit, shown schematically 25, configured and positioned to provide a view of only the flaps 20 may also be provided to confirm flaps positions and settings before takeoff and before landing. The views of the areas 30 and 32 indicated by the dashed lines generated by the monitoring units 24 may be transmitted through the processor 34 to a visual display (not shown) in the cockpit 28. This visual display enables the pilot and crew in the cockpit to see the actual flap position with a degree of accuracy not presently available. The FMC required flap setting may be compared with the actual flap setting as viewed through the monitoring unit. In one embodiment of the present monitoring system, visual indicators may be included with the display. For example, agreement or alignment between the actual observed flap position and the required flap setting may be confirmed with a green light, while disagreement or misalignment between flap position and flap setting may be indicated with a red light. Other visual or audible indicators may also be used for this purpose.

The present monitoring system may be adapted to provide communication between monitoring units (24, 26, and 27) and the Electronic Flight Bag (EFB) and the FMC, which are not shown but are typically in the cockpit. Detected flap positions from the monitoring units may be displayed on the EFB through an application (app) designed for that purpose. As noted above, there is more variation in takeoff flap positions for airports and runways now than in the past. Consequently, a pilot cannot rely on the standard takeoff flap settings that have customarily been used during most takeoffs. For example, the standard takeoff flap setting for the aircraft is a Flaps 5, but a longer runway at a specific airport may generate a flight plan with a Flaps 10 setting so an aircraft uses a lower takeoff power profile and consumes less fuel. The app allows the pilot to input the flight plan takeoff Flaps 10 setting to the EFB when the flight plan is exported to the FMC. The app may also provide visual or audio indicators that communicate a match between detected flap positions and flight plan flap settings, for example with a steady green display, or a conflict between detected flap positions and flight plan flap settings, for example with a blinking light that turns red and/or by sounding an alarm.

The present monitoring system makes it possible to generate and compare, as well as transfer, data related to flap settings in different situations, for example at the beginning of a forward roll and prior to landing. Approximate flap angle may also be determined. The monitoring system software may transfer data relating to misaligned flap setting and position and improper landing gear position to alert airport personnel in locations other than the aircraft cockpit that action is needed to align flap setting and position or to retract or extend landing gears. It is anticipated that control systems may be provided with intelligent software that will automatically correct the improperly aligned flaps and the improperly positioned landing gears.

In addition to providing a view of the flaps 20 on aircraft wings 18, the monitoring units 24 provide views of the leading edges 36 of the wings 18 and portions of engines 38 that are within the fields of view 30 and 32. These views will allow visual inspection of the wings 18, for example after de-icing, which will enable the pilot or crew to verify that those surfaces are clear of ice. During flight, the monitoring units may allow verification of wing and engine icing. Additionally, it will be possible to check in-flight damage due to mechanical failure, bird strikes, or other causes. In the event an evacuation is required, the monitoring units 24 can be used to determine that emergency exits are clear before the evacuation. It is anticipated that the monitoring units 24 will provide visual displays that may be useful in other situations as well.

FIG. 2 illustrates one possible field of view of the nose landing gear 14 provided by monitoring unit 26 within the dashed lines 40. Other fields of view (not shown) that encompass only the main landing gears 16 or both the main landing gears and the nose landing gear may also be provided by one or more monitoring units, and the meshed data may be transmitted to the cockpit 28 as a visual display. As noted above, visually monitoring the positions of the aircraft nose and main landing gears serves particularly to confirm that the landing gears are properly retracted following takeoff and properly extended prior to landing. Verifying the positions of the nose and/or main landing gears, especially to identify situations that are not normal, may prevent an aircraft flying with extended landing gears and an aircraft landing with retracted landing gears and the potential adverse consequences of these non-normal situations. In the situation described above when the landing gear position primary and secondary indicator lights were not in agreement, visual confirmation from the monitoring unit 26 would have indicated that the secondary indicator lights were not functioning accurately, and the pilot's unauthorized flight by the tower would not have been necessary. In addition to providing a visual display of landing gear position, the present monitoring system may also verify whether a tire mounted on a landing gear wheel has blown.

During taxi, the monitoring unit 26 may be configured to provide a view of the nose landing gear wheels and the main landing gear wheels and their location relative to the edge of the taxiway, which will assist the pilot and crew in preventing runway excursions and incursions. More often at smaller airports but also at larger ones, there have been numerous reports of ground taxi incidents in which aircraft have left the hard taxi surface and traveled onto muddy or grassy areas, sometimes resulting in aircraft damage. These incidents may typically result from the taxiing aircraft's pilot not being able to see the actual location of the main landing gear and wheels and/or the nose landing gear and wheels while turning from a runway onto a taxiway or from one taxiway to another. Enabling aircraft pilots and cockpit crew to see the precise location of the nose landing gears and wheels and/or the main landing gears and wheels on the ground surface and to avoid runway excursions may result in significant safety and operations benefits to pilots, airlines, and airports, Preventing such runway excursions may reduce or potentially eliminate the runway, taxiway, and even entire airport closures that arise all too frequently today when these incidents occur.

Monitoring a tail skid (not shown) or tail 29 of the aircraft 10 with the monitoring unit 27 may provide a view of the area 42 for communication to a visa al display in the cockpit 28 through the intelligent processor 34. Providing the aircraft pilot and crew with a view of the aircraft tail 29, particularly during takeoff and landing, shows the aircraft tail and tail skid real time positions relative to the ground and enables the pilot or crew to take the action required to raise the tail and avoid the aircraft tail or tail skid striking the ground surface. Currently, all tail strike incidents are considered to be potential structural failures and require the pilot to return the aircraft immediately to the airport for inspection. The present monitoring system provides additional real time information that enables the pilot to view the condition of the tail skid in flight following a tail strike occurrence, to evaluate the situation, and to decide what should be done based upon the real time information. Pilots are currently required to inspect the integrity of the tail-strike cartridges on tail skids during all pre-flight inspections for Boeing 737-800 aircraft, for example. With the present monitoring system, a pilot may perform this inspection while the aircraft is in flight following occurrence of a minor tail strike. Consequently, the automatic requirement to return the aircraft to the airport after tail skid contact with a ground surface may be eliminated when a pilot can verify that the tail strike cartridge has not been compromised.

The present invention further includes a method for monitoring aircraft flap positions and landing gear positions. Meshed data relating to aircraft flap positions and landing gear positions may be obtained from the monitoring units of the present monitoring system. This meshed data may be processed and analyzed, preferably by an artificial intelligence-based processing system using intelligent algorithms, to provide visual displays of flap positions and landing gear positions and conditions of other aircraft structures. Warnings of non-normal positions and conditions may be communicated to the cockpit, and, if warranted, flap or landing gear positions may be automatically or manually altered or required action may be taken to ensure that the aircraft is in a flight-ready state prior to takeoff.

The continuous secure data streaming provided by the present monitoring system may also provide an immensely valuable tool for the investigation of a number of aircraft incidents and accidents beyond those described above, including, for example, hull losses. The availability of real time video streams from the described monitoring units 24, 26, and 27, as well as from any additional monitoring units, may provide investigators with invaluable information that may orient investigations in a better direction at an early stage. For example, real time video information might determinatively indicate mechanical failure or might suggest intentional aircraft destruction, and an investigation may be focused accordingly. Further, the real time visual information generated by the present monitoring system might be useful in determining causation of incidents or accidents.

While the present invention has been described with respect to preferred embodiments, this is not intended to be limiting, and other arrangements and structures that perform the required functions are contemplated to be within the scope of the present invention.

INDUSTRIAL APPLICABILITY

The present invention will find its primary applicability when it is desired to improve aircraft takeoff and flight readiness to ensure that flaps, landing gears, and other aircraft exterior surfaces and structures are in a flight-ready state.

The invention claimed is:

1. An integrated intelligent monitoring system for ensuring safe taxi, takeoff, and flight readiness of an electric taxi system-driven aircraft, comprising:
   a. an aircraft equipped with one or more landing gear wheel-mounted electric taxi drive systems controllable to drive the aircraft during ground operations and travel at an airport;
   b. monitoring units mounted in exterior locations on said electric taxi system-driven aircraft selected to produce a composite stream of meshed data in a secure encrypted form representing real time targeted views of flaps angles on wings, of positions of landing gears, and of locations of a tail skid from said selected exterior locations on said electric taxi system-driven aircraft;
   c. an intelligent processing system comprising intelligent algorithms capable of intermediate and high level image understanding to receive transmission of said composite stream of meshed data representing said real time targeted views from said selected exterior locations in said secure encrypted form, to process said composite stream of meshed data to produce real time visual displays of said flaps angles, extended or retracted positions of said landing gears, and a location of said tail skid relative to an airport ground surface, to communicate said real time visual displays, and to compare said processed meshed data relating to real time flaps angles and real time positions of said landing gears with input data for required flaps angles and positions of said landing gears for said electric taxi system-driven aircraft at said airport;
   d. display devices to receive said communicated real time visual displays from said intelligent processing system located in at least a cockpit of said electric taxi system-driven aircraft; and
   e. an indicator system in data transmission communication with said intelligent processing system and with said display devices, said indicator system comprising visual or audio indicators of said flaps angles and said positions of said landing gears-different from said input data.

2. The system of claim 1, wherein at least two of said monitoring units are mounted and positioned in selected exterior locations on opposite sides of a fuselage of said equipped aircraft adjacent to or on each wing of said electric taxi system-driven aircraft to produce said composite stream of meshed data representing said real time targeted views of surfaces of each of said wings extending from said fuselage to a wing tip and angles of flaps on each of said wings and produce for communication to said intelligent processing system to produce said real time visual displays of said flaps angles for real time communication to said display devices, and said indicator system indicates presence or absence of alignment between said real time communicated visual displays of said flaps angles and said input data of required flaps angles for said airport or for a runway where the electric taxi system-driven aircraft is taking off.

3. The system of claim 1, wherein one or more of said monitoring units are mounted in selected exterior locations on a fuselage surface adjacent to said landing gears of said electric taxi system-driven aircraft to produce said composite stream of meshed data representing said real time targeted views of positions of said landing gears from said selected exterior locations for communication to said intelligent processing system to produce said real time visual displays for communication to said display devices, and said indicator system indicates extended or retracted positions of said landing gears at takeoff and landing different from said required landing gears extended or retracted positions.

4. The system of claim 1, wherein at least one of said monitoring units is mounted in a selected exterior location on a fuselage surface adjacent to a tail skid on said electric taxi system-driven aircraft to produce said composite stream of meshed data representing said real time views of a location of said tail skid for communication to said intelligent processing system to produce said real time visual displays for communication to said display devices of a position of said tail skid relative to a ground surface at said airport.

5. The system of claim 1, further comprising a flight management computer or an electronic flight bag in data transmission communication with said intelligent processing system to receive said input data for required flaps angles and positions of said landing gears for said electric taxi system-driven aircraft at said airport.

6. The system of claim 2, wherein said at least two monitoring units are mounted on said opposite sides of said fuselage, said composite stream of meshed data represents targeted real time views of entire surfaces of each said wing, and said real time visual displays indicate a presence or absence of ice on a portion of or on said entire surface of each said wing.

7. The system of claim 1, wherein said monitoring units comprise at least a scanning LiDAR device, a camera, or a scanning LiDAR device and a camera.

8. The system of claim 7, wherein said monitoring units are mounted in multiple selected exterior locations comprising opposite sides on a fuselage of said electric taxi system-driven aircraft adjacent to each wing to produce said composite stream of meshed data representing real time targeted views of said flaps angles on both wings of said electric taxi system-driven aircraft.

9. The system of claim 7, wherein said monitoring units are mounted in multiple selected exterior locations comprising on ground-facing surfaces of said electric taxi system-driven aircraft to produce said composite stream of meshed data representing said real time targeted views of extended and retracted positions of nose landing gears of main landing gears, and of both said nose landing gears and main landing gears on said electric taxi system-driven aircraft.

10. The system of claim 7, wherein at least one of said monitoring units is mounted in a selected exterior location comprising a ground-facing surface of said electric taxi system-driven aircraft to produce said composite stream of meshed data representing said real time targeted views of a tail skid position or condition on said electric taxi system-driven aircraft.

11. An intelligent monitoring method that monitors aircraft flaps angles and positions and determines aircraft readiness for safe taxi, takeoff, and flight at an airport, comprising:
a. providing an aircraft equipped for and moved during ground travel with landing gear wheel-mounted electric taxi drive systems and providing monitoring units operable to provide real time targeted views of aircraft exterior structures comprising wing surfaces and flaps on the electric taxi system-driven aircraft and to produce composite streams of meshed data in a secure encrypted form representing the real time targeted views;
b. mounting the monitoring units on exterior surface locations on opposite sides of a fuselage adjacent to or on each wing selected to obtain the real time targeted views of each wing surface, flaps, and angles of the flaps on each wing of the electric taxi system-driven aircraft from the fuselage surface locations, and producing the composite stream of meshed data in the secure encrypted form representing the real time targeted views of each of the wing surfaces, the flaps on each of the wings, and angles of the flaps on each of the wings;
c. providing an intelligent processing system comprising intelligent algorithms capable of intermediate and high level image understanding in communication with the monitoring units, transmitting the composite stream of meshed data in the secure encrypted form representing the real time targeted views of the wing surfaces, the flaps, and the angles of the flaps to the intelligent processing system, and processing the composite stream of meshed data to produce a real time visual display of the wing surfaces and real time angles and positions of the flaps;
d. inputting data relating to required flaps settings and angles for a takeoff location of the electric taxi system-driven aircraft at the airport to an electronic device in data communication with the intelligent processing system and communicating the inputted required flaps settings and angles data to the intelligent processing system;
e. providing a display device and an indicator system in a cockpit of the electric taxi system-driven aircraft and communicating the real time visual display with the real time flaps angles to the display device; and
f. comparing the real time visual display with the real time flaps angles with the inputted required flaps setting and angles data for the airport and indicating alignment of the real time flaps angles position with the required flaps angles setting or misalignment of the real time flaps angles position with the required flaps angles setting with the indicator system.

12. The method of claim 11, further comprising inputting the data relating to the required flaps settings and angles in an electronic device comprising a flight management computer or an electronic flight bag.

13. The method of claim 11, further comprising automatically adjusting the real time flaps angles and positions to align with the inputted required flaps settings and angles.

14. The method of claim 11, further comprising mounting additional monitoring units in selected exterior locations on a ground-facing surface of the electric taxi system-driven aircraft to obtain real time targeted views of each landing gear on the electric taxi system-driven aircraft, producing the composite stream of meshed data representing the real time targeted views of each landing gear with positions of each landing gear, communicating the composite stream of meshed data to the intelligent processing system, transmitting the real time visual display with the landing gear positions from the intelligent processing system to the display device, and automatically or manually retracting or extending the landing gear as required by the landing gear positions shown in the real time visual display.

15. The method of claim 11, further comprising mounting additional monitoring units in exterior locations on a ground-facing surface of the electric taxi system-driven aircraft to obtain real time targeted views of a tail skid and a tail skid cartridge on a tail of the electric taxi system-driven aircraft, producing and processing the composite stream of meshed data representing the real time targeted views of a position the tail skid relative to a ground surface when the electric taxi system-driven aircraft is taking off or a condition of the tail skid cartridge after contact with a ground surface, communicating the real time targeted views to the intelligent processing system, transmitting the real time visual display with the tail skid position or tail skid cartridge condition from the intelligent processing system to the display device, and automatically or manually controlling the aircraft to raise or lower the tail as required by the tail skid position or the tail skid cartridge condition shown in the real time visual display.

16. The method of claim 15, further comprising analyzing the real time visual display of the tail skid cartridge following a tail strike incident, making an in-flight inspection of integrity of the tail skid from the real time visual display, and determining whether the electric taxi-driven aircraft is flight worthy.

17. The method of claim 11, wherein the monitoring units comprise at least a scanning LiDAR device, a camera, or a scanning LiDAR device and a camera.

18. An intelligent monitoring method that monitors aircraft landing gear extended and retracted positions prior to takeoff and landing to determine safe takeoff and landing readiness, comprising:
   a. providing an aircraft equipped with nose and main landing gears and providing monitoring units operable to provide real time targeted views of the nose and main landing gears on the aircraft and to produce a composite stream of meshed data in a secure encrypted form representing the real time targeted views;
   b. mounting the monitoring units in exterior locations on ground-facing surfaces of the aircraft selected to obtain the targeted real time views of the nose landing gear and the targeted real time views of the main landing gears on the aircraft, and, during takeoff of the aircraft and during landing of the aircraft, producing composite streams of meshed data in the secure encrypted form representing the real time targeted views of the nose landing gear and the main landing gears during takeoff and during landing;
   c. providing an intelligent processing system comprising intelligent algorithms capable of intermediate and high level image understanding in communication with the monitoring units, transmitting the composite stream of meshed data representing the real time views during takeoff and during landing of the nose landing gear and the main landing gears in the secure encrypted form to the intelligent processing system, and processing the meshed data to produce a real time visual display of the real time extended and retracted positions of both the nose landing gear and the main landing gears during takeoff and during landing;
   d. providing a display device in a cockpit of said aircraft and communicating the real time visual display with the real time extended or retracted positions of the nose landing gear and the main landing gear during takeoff and during landing to the cockpit display device; and
   e. viewing the real time visual display of the real time nose and main landing gear extended and retracted positions in the cockpit display device, visually confirming proper extension or retraction of the nose and main landing gears upon takeoff and landing or improper retraction or extension of the nose and main landing gears upon takeoff and landing, and automatically or manually extending or retracting the nose and main landing gears as required for safe takeoff and landing.

19. The method of claim 18, wherein the aircraft is further equipped with and driven during ground operations and travel by a landing gear wheel-mounted electric taxi drive system.

* * * * *